United States Patent [19]

Brugman et al.

[11] 4,434,885
[45] Mar. 6, 1984

[54] OVERCAP ORIENTING APPARATUS

[75] Inventors: Martin Brugman; Herman Van Schaik, both of Amsterdam, Netherlands

[73] Assignee: S. C. Johnson & Sons, Inc., Racine, Wis.

[21] Appl. No.: 344,160

[22] Filed: Jan. 29, 1982

[51] Int. Cl.³ .............................................. B65G 47/24
[52] U.S. Cl. ....................................... 198/388; 198/397
[58] Field of Search ....................... 198/388, 396, 397; 221/160–161, 164, 166

[56] References Cited

U.S. PATENT DOCUMENTS 3,070,209 12/1962 Young ................................... 198/397
3,572,494 3/1971 Aidin et al. ....................... 198/388 X

FOREIGN PATENT DOCUMENTS 559375 9/1932 Fed. Rep. of Germany ...... 221/166

Primary Examiner—Charles A. Marmor

[57] ABSTRACT

Apparatus for arranging overcaps in like orientation. The apparatus includes a cylindrical bin for holding a large number of jumbled overcaps. The bin has an opening on one side along which a chute is located. A cylindrical array of horizontal flight bars, each pivotal about a horizontal axis and each having a multiplicity of pick-up sites spaced therealong, is arranged to rotate through the bin such that the bars pass the edge of the chute seriatim along a downward arc. Each pick-up site includes an overcap-receiving cavity and a pick-up pin extending from an overcap support surface. The device includes means to pivot the flight bars to different orientations depending on their positions of rotation within the bin. The configuration of the pick-up sites and the control of flight bar orientation serves to capture overcaps on the pick-up pins and deposit them in like orientation on the chute for movement toward an automatic capper.

1 Claim, 9 Drawing Figures

OVERCAP ORIENTING APPARATUS

FIELD OF THE INVENTION

This invention is related in general to automatic filling and packaging equipment and more specifically to equipment for orienting overcaps such as those used on aerosol containers.

BACKGROUND OF THE INVENTION

Aerosol packages typically include a cylindrical metal container one end of which is domed and has a centrally located, protruding aerosol valve stem. Some aerosol packages, which include a simple actuator button mounted to the stem, have their domed end covered by a cup-shaped overcap. Others have what is commonly referred to as an actuator-overcap over their domed end. Actuator-overcaps usually include a tab or button which is secured to the valve stem and terminates in a discharge orifice. Actuator-overcaps and simple cup-shaped overcaps must be snapped onto the aerosol containers, typically after the filling thereof.

Actuator-overcaps and simple cup-shaped overcaps are typically plastic molded constructions, although some are made of metal. Overcaps and actuator-overcaps have open bottoms typically including an annular edge which may be snapped onto the aerosol container double seam, a portion of the aforementioned dome, or to some other part of the valved end of the container. The term "overcap" will be used herein to refer to both simple cup-shaped overcaps and to the more complex actuator-overcaps. All aerosol overcaps are joined at their open bottoms to the valved ends of aerosol containers.

The invention which will be described and claimed herein has primary application in the field of aerosol packaging. However, this invention is not limited to aerosol packaging, but may be used in other fields in which overcaps of any type are used. For convenience, the invention will be described with reference to aerosol overcaps.

High speed in-line filling equipment is widely used in the aerosol packaging industry. Filling speeds of as much as 500 units per minute on a single line are not uncommon. After the aerosol filling and charging steps, an overcap is usually applied to the aerosol container. This may be done by hand on an in-line work table, but is preferably carried out automatically by special capping equipment.

When such capping equipment is used it is necessary to feed a stream of overcaps in like orientation, such as with their open bottoms facing downwardly, to the capping equipment. Since such overcaps are usually received at the aerosol filling and assembly plant jumbled in a box, bag, or other large container, it is necessary to arrange such overcaps in like orientation as they are prepared to approach the capping equipment. This invention deals with apparatus for arranging overcaps in like orientation for this purpose.

Prior equipment used for automated arrangement of overcaps in like orientation has exhibited severe shortcomings. In particular, such equipment has often tended to mis-orient unacceptably large numbers of overcaps among the properly oriented overcaps. In addition, such equipment sometimes has scattered unacceptably large numbers of overcaps about the equipment. For these reasons, the constant attention of operators to correct such problems has been a necessity. This defeats one purpose of automatic overcap orienting equipment.

Another problem of prior overcap orienting devices has been their relative incapability of dealing with overcaps of significantly varying sizes and shapes. There has been a need for improved equipment which could be used to orient overcaps of substantially varying sizes and shapes.

OBJECTS OF THE INVENTION

The primary object of this invention is to provide improved apparatus for arranging overcaps in like orientation.

Another object of this invention has been to provide overcap orienting apparatus overcoming certain problems of prior equipment.

Another object of this invention is to provide apparatus for arranging overcaps in like orientation which can accept and arrange overcaps of substantially varying sizes and shapes.

Still another object of this invention is to provide apparatus for arranging overcaps in like orientation which eliminates or minimizes the number of misoriented overcaps.

Yet another object of this invention is to provide apparatus for arranging overcaps in like orientation which eliminates or greatly reduces scattering of overcaps around the equipment.

Other objects of this invention will be apparent from the following descriptions of this invention.

BRIEF SUMMARY OF THE INVENTION

This invention is an apparatus for arranging overcaps in like orientation which overcomes the aforementioned problems. The apparatus includes a cylindrical-walled bin for holding jumbled overcaps. Such bin has an opening on one side. Beside the bin is a chute having a horizontal upper edge along the bin opening. Within the bin is a cylindrical array of horizontal flight bars which rotates through the jumbled overcaps within the bin much like a paddlewheel. Each of the flight bars is pivotable about a horizontal axis parallel to the cylindrical bin wall. Each bar has a multiplicity of pickup sites. The flight bars are close to the cylindrical wall of the bin and the array is rotated within the bin such that the flight bars pass the chute edge seriatim along a downward arc.

Each pickup site includes an overcap support surface parallel to and spaced from the axis of the flight bar of which it is a part and lateral walls extending from the support surface toward the axis to form an overcap-receiving cavity. Each pickup site also has a pickup pin extending from the support surface toward the axis.

As the array of flight bars is rotated through the bin, each bar is pivoted to a specific orientation dictated by the position of rotation within the bin. The configuration of the pickup sites, the movement of the flight bar along the cylindrical bin wall, and the changing pivoting orientation of the bar during its movement around the bin allow the pickup sites to capture overcaps in their overcap-receiving cavities, invert them such that their open bottoms slide over the pickup pins, deposit them bottom down onto the chute, and withdraw the pins to free the overcaps to slide down the chute in like orientation.

Every pickup site will not pick up an overcap on every pass through the bin. Instead, one, two or several overcaps will typically be picked up by a flight bar during movement through the bin.

A typical pass of a flight bar through the bin would be as follows: A few of the jumbled overcaps will be received into overcap-receiving cavities along such bar with their open bottoms up as the flight bar moves through the lower portion of the bin. As rotation of the array continues, such captured overcaps will gradually be inverted such that their open bottoms slide over the pickup pins in their respective overcap-receiving cavities. Such inversion will be completed as the flight bar reaches the upper portion of the bin. As flight bar movement through the bin continues, the flight bar holding such overcaps will approach the horizontal upper edge of the chute along a downward arc. During this portion of flight bar movement through the bin, the pivotal orientation of the flight bar will be such that the horizontal upper edge of the chute intersects the path of the captured overcaps beyond the center of gravity of such overcaps. Then, just as contact of the bottom edges of the overcaps is established with the chute, the flight bar is quickly rotated to withdraw the pickup pin and free the overcaps to slide down the chute. Thereafter, the rotation of the flight bar array continues and the process is repeated.

The rotation of the array of flight bars is preferably continuous. The speed of rotation, the number of pickup sites on each flight bar, and other factors including the size and shape of the overcaps will determine the rate at which overcaps in like orientation are fed down the chute and thence to the capper. Equipment made in accordance with the invention can feed overcaps in like orientation at a rate sufficient to satisfy the requirements of high speed aerosol filling lines. This can be achieved with equipment of reasonable size and operational speed.

The apparatus of this invention operates consistently without misorienting overcaps, even when used on overcaps of a variety of sizes and shapes. Furthermore, there is little or no scattering of overcaps about such equipment.

DETAILED DESCRIPTION OF PREFERRED EMBODIMENTS

Figure 1:
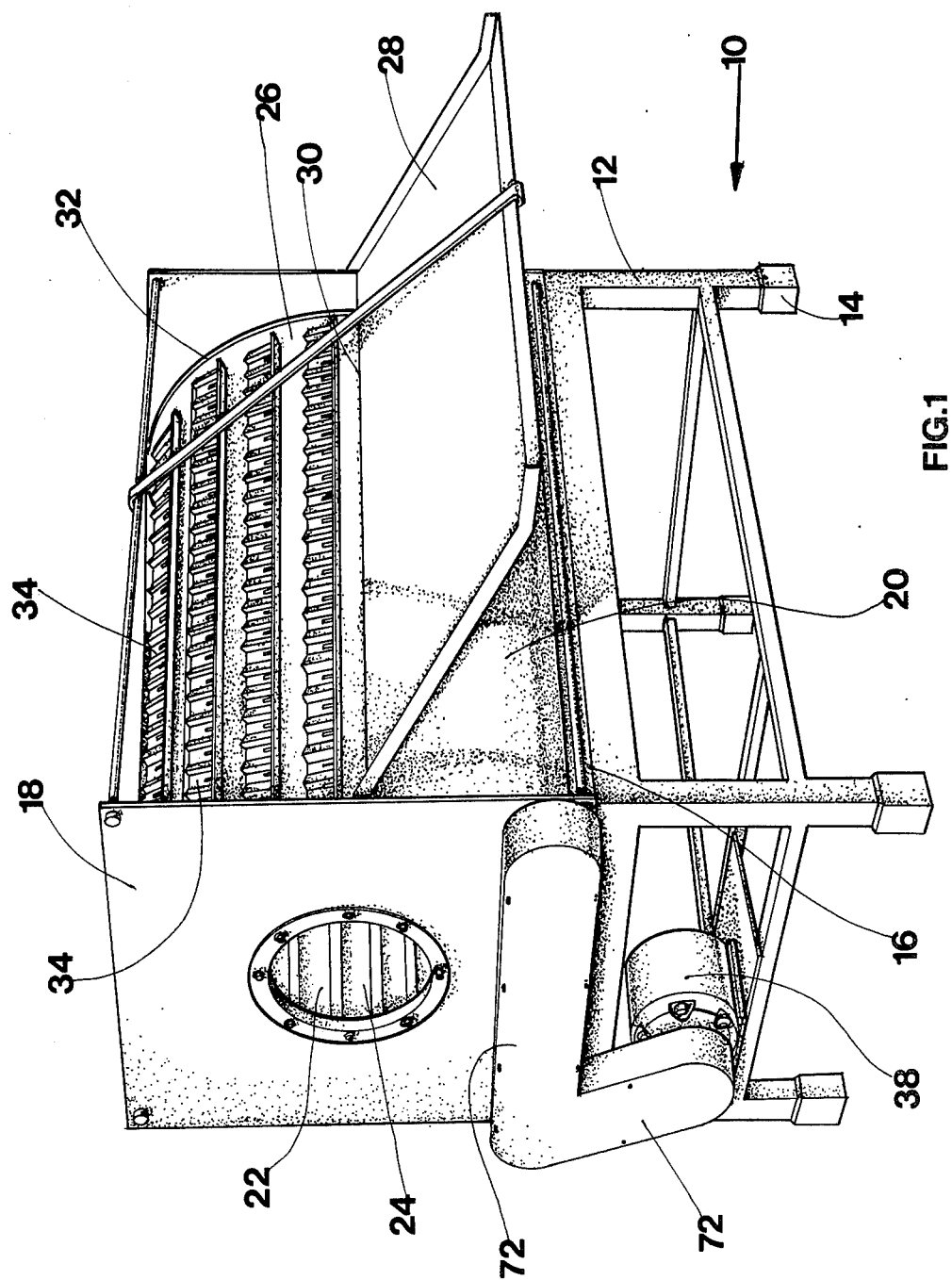
FIG. 1 is a perspective view of an apparatus in accordance with this invention.
Figure 2:
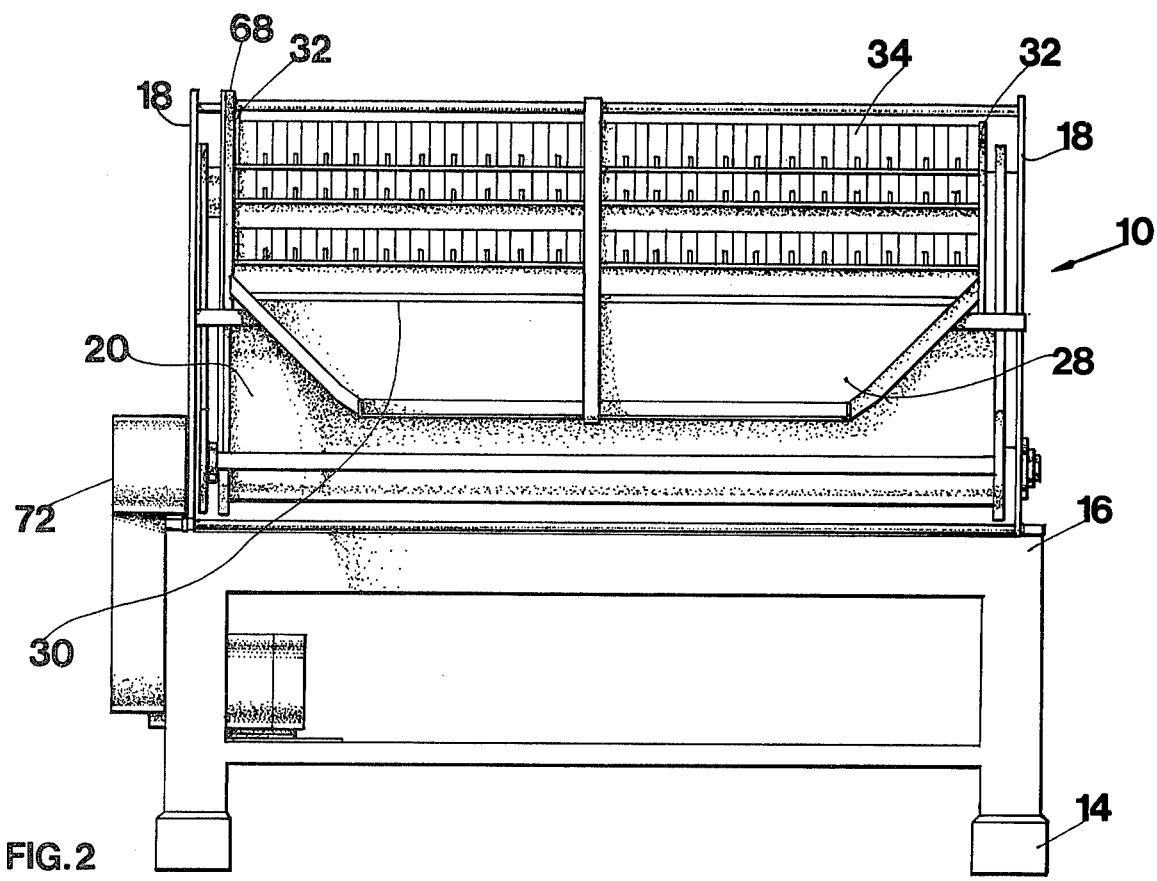
FIG. 2 is a front elevation of the device of FIG. 1.
Figure 3:
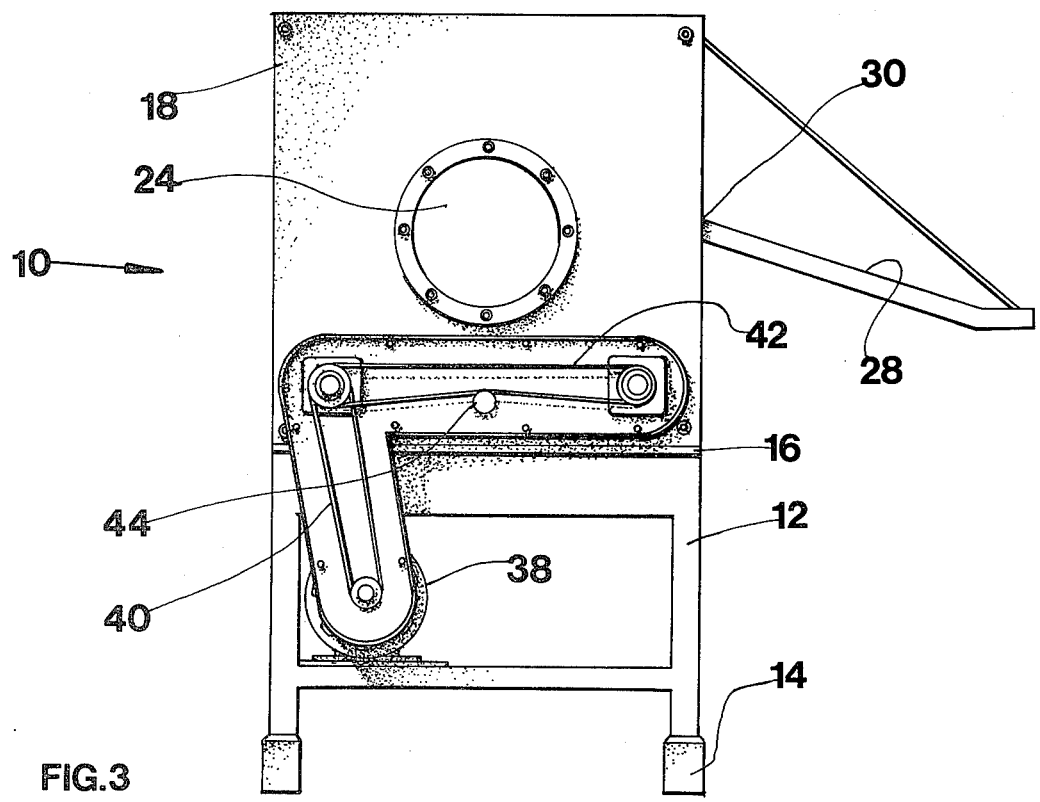
FIG. 3 is a left side elevation with some portions removed to better illustrate operation.

FIGS. 1-3 are illustrations of a complete overcap orienting apparatus (10) in accordance with this invention. Overcap orienting apparatus (10) includes a support frame (12) having legs (14) for resting on a floor and an upper support or table (16). Upright end plates (18) are secured to table (16) at either end of support frame (12). Many of the operational elements of overcap orienting apparatus (10) are located between end plates (18).

Figure 4:
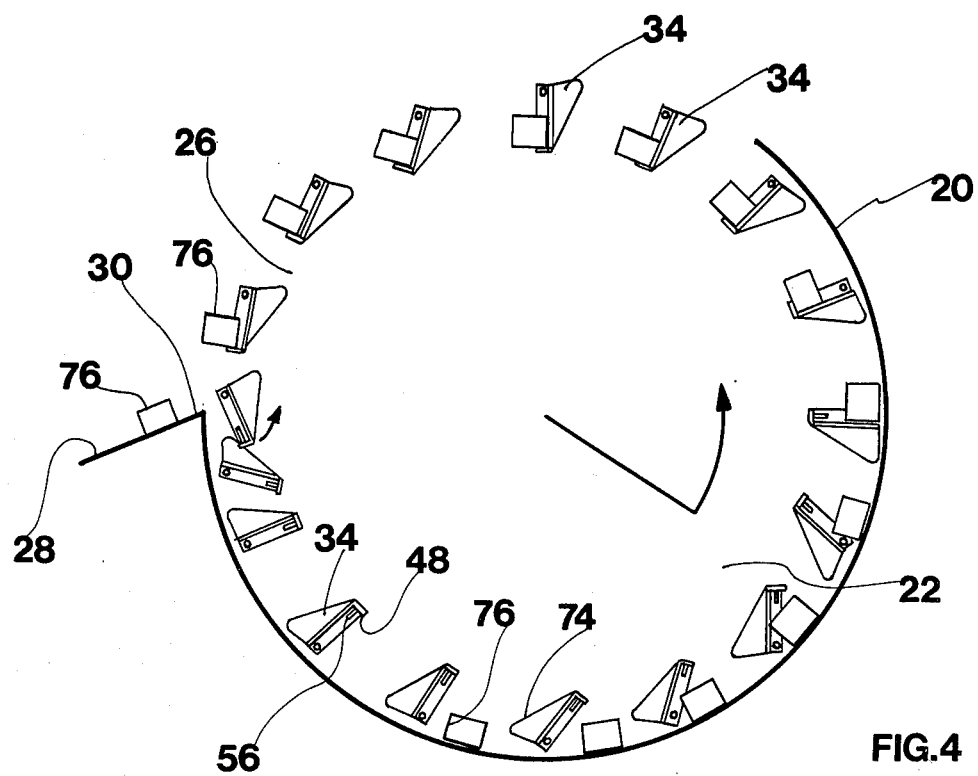
FIG. 4 is a fragmentary right sectional schematic which illustrates operation of the invention.
Figure 5:
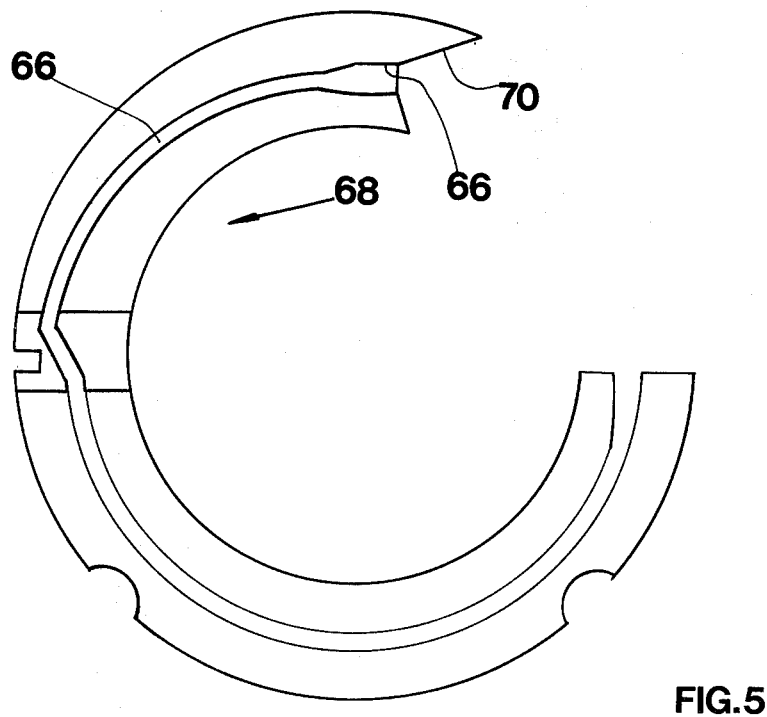
FIG. 5 is a right fragmentary sectional view illustrating the cam track which controls flight bar orientation.
Figure 9:
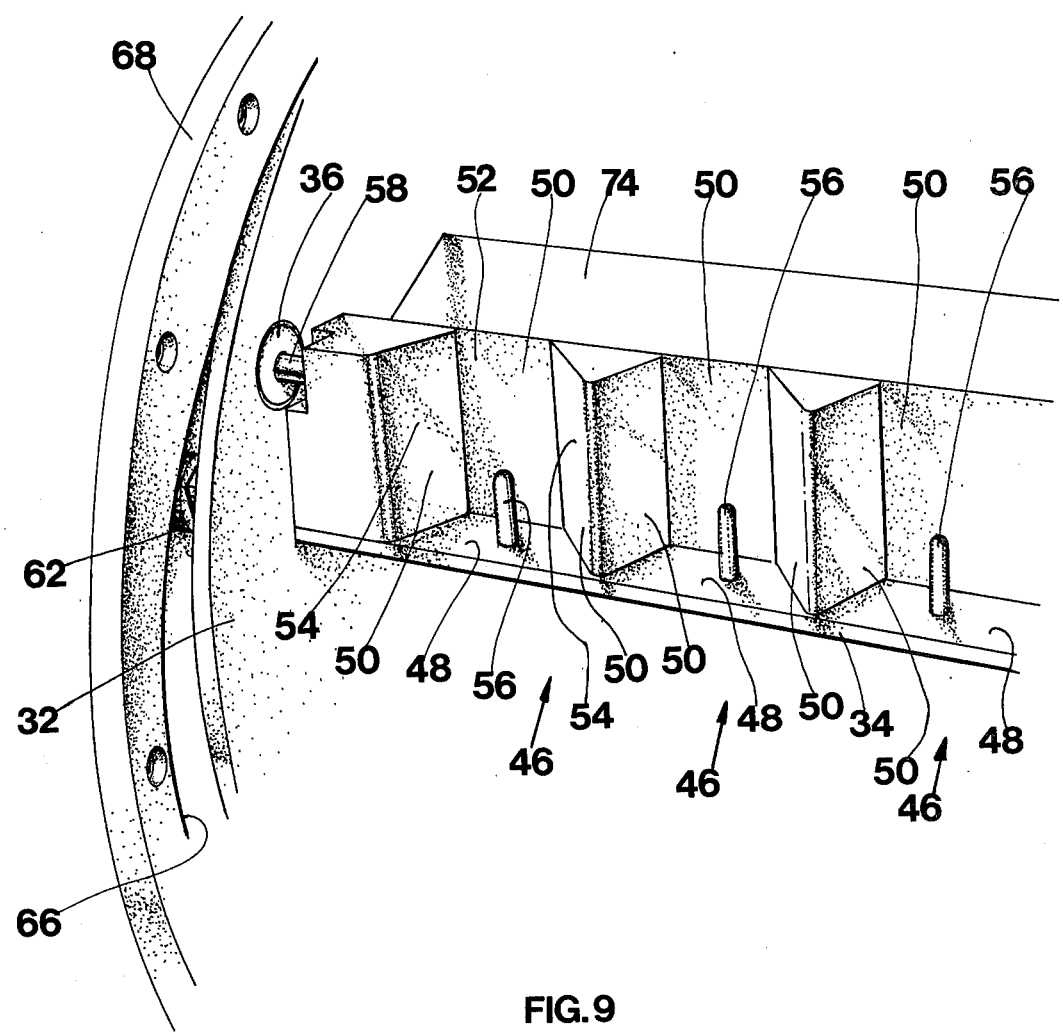
FIG. 9 is a fragmentary perspective view of a flight bar and the surrounding apparatus.

As shown in FIGS. 1 and 2 and best illustrated in the schematic FIG. 4, a cylindrical wall (20) extends between end plates (18) and forms with end plates (18) a bin (22) for holding hundreds of jumbled overcaps. An inlet (24), which is formed in one of the end plates (18), allows jumbled overcaps to be poured into bin (22), even as operation of overcap orienting apparatus (10) continues. Cylindrical wall (20) does not form a complete cylinder, but has an upward opening (26). As viewed in FIG. 4, opening (26) extends approximately from a nine o'clock position to a one o'clock position. The opening is also seen in FIGS. 1, 2 and 9.

A flat chute (28) is attached to end plates (18) and is inclined downwardly away from its horizontal upper edge (30) which is located along opening (26). Overcaps which are removed from overcap orienting apparatus (10) slide down chute (28) in like orientation and are then fed to a capping machine on the aerosol filling line.

Concentrically aligned with cylindrical wall (20) and located within bin (22) at either end thereof are circular rotatable supports (32). Supports (32) are secured to one another by several cross bars (not shown) which are located near the axis defined by cylindrical wall (20). Rotatable supports (32) are rotatably mounted with respect to end plates (18), such mounts not being shown in the drawings. Extending between rotatable supports (32) are a cylindrical array of horizontal flight bars (34). Flight bars (34) are equally spaced about the edges of rotatable supports (32) and are pivotably mounted on rotatable supports (32) as illustrated in FIGS. 4 and 9. FIG. 9 illustrates a pivot mount (36) of flight bars (34) with rotatable supports (32).

Rotatable supports (32) and the array of flight bars (34) carried between them are rotated at a steady rate by the mechanical linkage shown in FIGS. 1, 2 and 3, including electric motor (38), the chain linkages which includes chains (40) and (42), and a drive member (44) which is journaled in end plate (18) and extends into bin (22) to engage one of the rotatable supports. The chain linkages are covered by sheaths (72) shown in FIGS. 1 and 2. A wide variety of other acceptable drive mechanisms will be apparent to those skilled in the art.

Each flight bar (34) has a multiplicity of pickup sites (46) equally spaced along its length. Each pickup site (46) includes an overcap support surface (48) which is suspended parallel to and spaced from the pivot axis of such flight bar. Each pickup site further includes lateral walls (50) which are perpendicular to overcap support surface (48) and extend therefrom toward the pivot axis of the flight bar. For each pickup site, lateral walls (50) and overcap support surface (48) form an overcap-receiving cavity. For each pickup site (46) there are three lateral walls, including a back wall (52) and two outwardly flaring end walls (54). This configuration allows the pickup sites to gather to themselves overcaps the cylindrical walls of which contact lateral walls (50).

Figure 8:
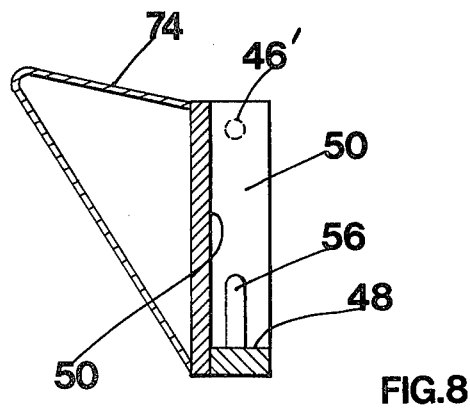
FIG. 8 is a left sectional view taken along section 8—8 as illustrated in FIG. 7.

As illustrated best in FIG. 8, which shows the location of pivot axis (46)' in phantom lines, each pickup site (46) has a pickup pin (56) extending from overcap support surface (48) toward the pivot axis in a direction generally parallel to lateral walls (50). Pickup pins (56) serve to hold overcaps at pickup sites (46) after their open bottom ends have slid over pickup pins (56).

The array of flight bars (36) is rotated through the jumbled overcaps filling or substantially filling the lower portion of bin (22). The movement of flight bars (34) through such jumbled overcaps and the orientation of flight bars (34) during such movement allow the capture of overcaps for later release in like orientation on chute (28). The orientations of flight bars (34) at different positions of their movement around bin (22) are determined by cam devices, one of which is illustrated in FIGS. 5, 6, 7 and 9, and by the weight distribution about the flight bar pivot axes. As shown best in FIGS. 4, 6, 8 and 9, each flight bar (34) includes a weight wing (74) which affects the natural "hang" position of the bar from its pivot axis. The weighting should allow overcaps to be cradled within overcap-receiving cavities when the flight bar is hanging freely. The pivot axis, of course, is defined by the pivot pins (58) at either end thereof. Such pins are non-rotatably secured to flight bar (34) and extend toward pivot mount (36) in the adjacent rotatable supports (32), as previously described.

Figure 7:
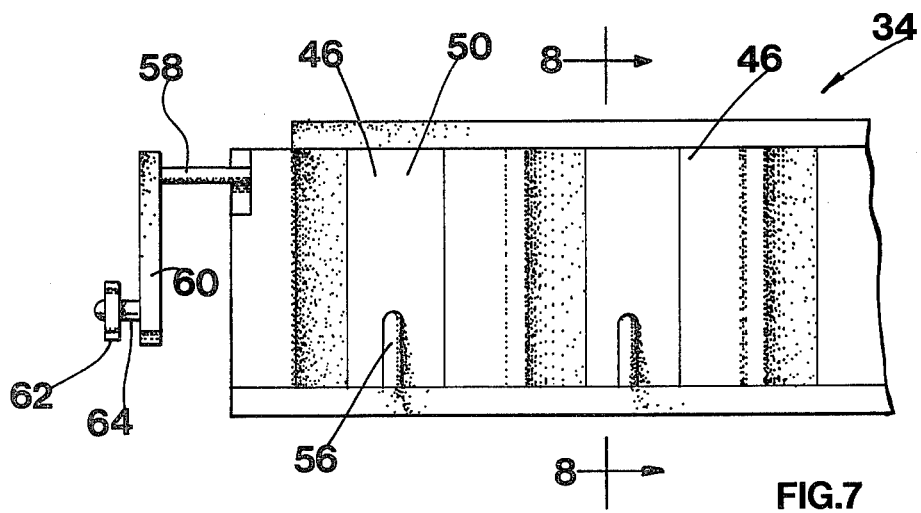
FIG. 7 is a front view of FIG. 6.
Figure 6:
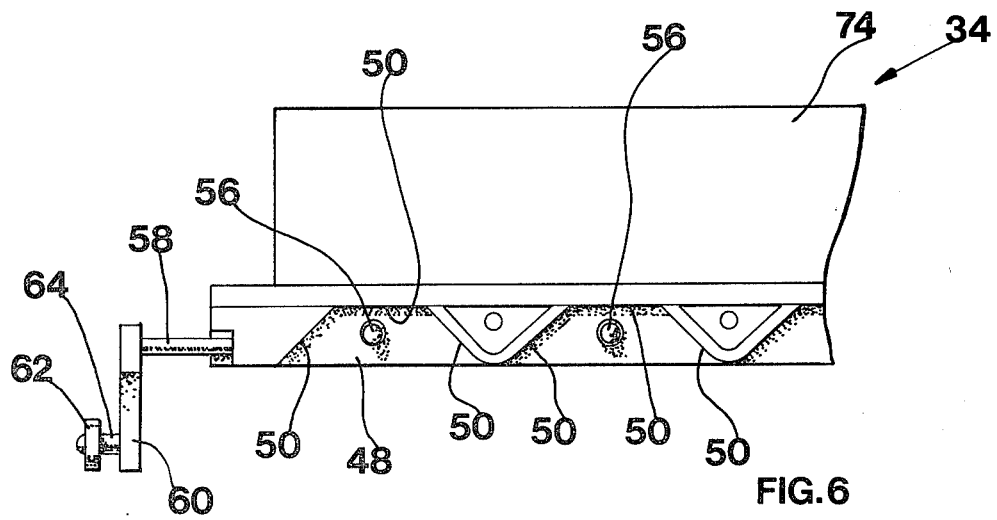
FIG. 6 is a fragmentary top view of a flight bar, illustrating pickup sites thereon.

The pivot pins at the left ends of the flight bars, as shown in FIGS. 6, 7 and 9, extend through rotatable support (32). The end of each such pin (58) is non-rotatably secured to one end of a cam arm (60). At the opposite end of cam arm (60), a cam follower roller (62) is secured on a roller pin (64). The cam roller (62) associated with each flight bar is engaged in a cam track (66) formed in a cam member (68). Cam member (68) is secured inside the end plate (18) to which it is adjacent. It is positioned between such end plate (18) and the rotatable support (32) at that end of the apparatus.

As the array of flight bars (34) rotates through bin (22), the interaction of cam rollers (62) and cam track (66) determines the orientations of the bars (34) at their changing positions within bin (22). Such positions are illustrated best in schematic FIG. 4, in which rotation of the flight bar array is counterclockwise.

The orientation and operation of each flight bar as it moves around bin (22) are as follows, beginning with the seven o'clock position in FIG. 4. At the seven o'clock position, the cam track dictates that flight bar (34) be in a position such that its pickup pins (56) and lateral walls (50) are approximately perpendicular to the line tangent to cylindrical wall (20) at that position. Stated differently, pickup pins (56) and overcap support surface (48) of such flight bar are moved to a position remote from cylindrical wall (20). As movement of such flight bar (34) continues in a counterclockwise direction, many overcaps will be encountered by various pickup sites along such bar. Some overcaps (76) will be encountered while they are in an essentially inverted (open end up) position with their top surfaces against cylindrical wall (20). When such encounters occur, such overcaps will tend to be gathered toward back wall (52) by contact with end walls (54). Such gathering or centering occurs primarily as the flight bar moves between the seven o'clock and three o'clock positions.

As such flight bar moves from about the three o'clock position to about the one o'clock position, its orientation is free from restraint of cam track (66); indeed, in this position the flight bar (34) might tend to rock a bit about its pivot axis as it is suspended below such axis. As a flight bar reaches approximately the one o'clock position, its associated cam roller (62) will engage guide surface (70) which will lead cam roller (62) into cam track (66). This will tend to pivot such flight bar to some extent in a counterclockwise direction. During flight bar movement between the three o'clock and twelve o'clock positions, any cap cradled properly in an overcap-receiving cavity with its open end facing pickup pin (56) will slide over pin (56) to be firmly captured by the pickup site. An overcap cradled in an overcap-receiving cavity with its closed end facing pickup pin (56) will hit pin (56) but later tumble off the flight bar. The thickness of pickup pin (56) is greater than any aperture on the top of an actuator-overcap to prevent any such actuator-overcap from sliding over the pin. Many other overcaps not properly cradled will also tumble back into the lower portion of bin (22), probably in a different position and orientation for later pickup. Such tumbling action will continue well beyond the twelve o'clock position.

As a flight bar moves from about the one o'clock position to about the nine o'clock position, the cam device will properly orient the overcaps in their pickup sites to intersect horizontal upper edge (30) of chute (28) with their centers of gravity beyond edge (30). At the moment of contact of such overcaps with chute edge (30), cam follower roller (62) moves radically as required by cam track (66) to quickly rotate such flight bar in a counterclockwise direction to withdraw the pickup pin and allow overcap (76) to slide freely down chute (28) with its open bottom end against chute (28). Thereafter, the flight bar repeats the entire operation.

Cam member (68) may be designed to accommodate a variety of overcap diameters. In some case, particular cam members can be inserted to improve the operation of the device for various overcaps, such as by assuring that the overcaps on flight bars (34) are in the proper position as they approach horizontal upper edge (30) of chute (28).

The parts of the overcap orienting apparatus are all made of well known materials. Acceptable choices of materials would be apparent to those skilled in the art. A wide variety of control mechanisms may be used and acceptable choices would be apparent to those skilled in the art.

While in the foregoing specification, this invention has been described in relation to certain preferred embodiments and many details have been set forth for purpose of illustration, it will be apparent to those skilled in the art that the invention is susceptible to additional embodiments and that certain of the details described herein can be varied considerably without departing from the basic principles of the invention.

What is claimed is:

1. Apparatus for arranging in like orientation overcaps of the type having open bottoms, comprising;
   a bin for holding jumbled overcaps, said bin having a cylindrical wall with an opening on one side;
   a chute beside said bin, having a horizontal upper edge along said opening;
   a cylindrical array of horizontal flight bars within said bin, each of said bars pivotable about a horizontal axis and having a multiplicity of pickup sites spaced therealong;
   means to rotate said array such that said bars pass said edge seriatim along a downward arc;
   each pickup site having an overcap support surface parallel to and spaced from said axis, lateral walls extending from said support surface toward said axis and forming with said support surface an overcap-receiving cavity, and a pickup pin extending from said support surface toward said axis; and
   means to pivot said bars to different orientations at different positions within said bin, thereby to: (1) capture overcaps in said cavities with their bottoms spaced from said support surfaces and facing said pins, (2) invert said overcaps such that they slide over said pins, (3) deposit said overcaps bottom down onto said chute, and (4) withdraw said pins to free said overcaps to slide down said chute in like orientation.

* * * * *